US006553385B2

(12) United States Patent
Johnson et al.

(10) Patent No.: US 6,553,385 B2
(45) Date of Patent: *Apr. 22, 2003

(54) ARCHITECTURE OF A FRAMEWORK FOR INFORMATION EXTRACTION FROM NATURAL LANGUAGE DOCUMENTS

(75) Inventors: David E. Johnson, Cortlandt Manor, NY (US); Thomas Hampp-Bahnmueller, Tuebingen (DE)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,408

(22) Filed: Sep. 1, 1998

(65) Prior Publication Data

US 2002/0007358 A1 Jan. 17, 2002

(51) Int. Cl.[7] .............................................. G06F 17/00
(52) U.S. Cl. ........................................ 707/104.1; 704/9
(58) Field of Search ............................... 707/1, 2, 3–6, 707/104.1; 706/45; 704/9; 709/328

(56) References Cited

U.S. PATENT DOCUMENTS

| 4,736,320 | A | * | 4/1988 | Bristol | 395/703 |
|---|---|---|---|---|---|
| 4,965,763 | A | * | 10/1990 | Zamora | 704/1 |
| 5,371,807 | A | * | 12/1994 | Register et al. | 382/159 |
| 5,680,628 | A | * | 10/1997 | Carus et al. | 704/1 |
| 5,682,539 | A | * | 10/1997 | Conrad et al. | 704/9 |
| 5,974,412 | A | * | 10/1999 | Hazlehurst et al. | 707/3 |
| 5,991,710 | A | * | 11/1999 | Papineni et al. | 704/2 |
| 6,006,221 | A | * | 12/1999 | Liddy et al. | 707/5 |
| 6,052,693 | A | * | 4/2000 | Smith et al. | 707/104 |
| 6,070,133 | A | * | 5/2000 | Brewster et al. | 704/9 |
| 6,076,088 | A | * | 6/2000 | Paik et al. | 707/5 |
| 6,081,773 | A | * | 6/2000 | Hirai et al. | 704/3 |

* cited by examiner

Primary Examiner—Safet Metjahic
Assistant Examiner—Uyen Le
(74) Attorney, Agent, or Firm—Whitham, Curtis & Christofferson, P.C.; Stephan C. Kaufman (57) ABSTRACT

A framework for information extraction from natural language documents is application independent and provides a high degree of reusability. The framework integrates different Natural Language/Machine Learning techniques, such as parsing and classification. The architecture of the framework is integrated in an easy to use access layer. The framework performs general information extraction, classification/categorization of natural language documents, automated electronic data transmission (e.g., E-mail and facsimile) processing and routing, and plain parsing. Inside the framework, requests for information extraction are passed to the actual extractors. The framework can handle both pre- and post processing of the application data, control of the extractors, enrich the information extracted by the extractors. The framework can also suggest necessary actions the application should take on the data. To achieve the goal of easy integration and extension, the framework provides an integration (outside) application program interface (API) and an extractor (inside) API.

13 Claims, 3 Drawing Sheets

ARCHITECTURE OF A FRAMEWORK FOR INFORMATION EXTRACTION FROM NATURAL LANGUAGE DOCUMENTS

BACKGROUND OF THE INVENTION

1. Field of the Invention

The present invention generally relates to knowledge information processing and, more particularly, to a general architecture of a framework for information extraction from natural language (NL) documents. The framework can be configured and integrated in applications and may be extended by user built information extractors.

2. Background Description

Businesses and institutions generate many documents in the course of their commerce and activities. These are typically written for exchange between persons without any plan for machine storage and retrieval. The documents, for purposes of differentiation, are described as "natural language" documents as distinguished from documents or files written for machine storage and retrieval.

Natural language documents have for some time been archived on various media, originally as images and more recently as converted data. More specifically, documents available only in hard copy form are scanned and the scanned images processed by optical character recognition software to generate machine language files. The generated machine language files can then be compactly stored on magnetic or optical media. Documents originally generated by a computer, such as with word processor, spread sheet or database software, can of course be stored directly to magnetic or optical media. In the latter case, the formatting information is part of the data stored, whereas in the case of scanned documents, such information is typically lost.

There is a significant advantage from a storage and archival stand point to storing natural language documents in this way, but there remains a problem of retrieving information from the stored documents. In the past, this has been accomplished by separately preparing an index to access the documents. Of course, the effectiveness of this technique depends largely on the design of the index. A number of full text search software products have been developed which will respond to structured queries to search a document database. These, however, are effective only for relatively small databases and are often application dependent; that is, capable of searching only those databases created by specific software applications.

The natural language documents of a business or institution represents a substantial resource for that business or institution. However, that resource is only [a] as valuable as the ability to access the information it contains. Considerable effort is now being made to develop software for the extraction of information from natural language documents. Such software is generally in the field of knowledge based or expert systems and uses such techniques as parsing and classifying. The general applications, in addition to information extraction, include classification and categorization of natural language documents and automated electronic data transmission processing and routing, including E-mail and facsimile.

SUMMARY OF THE INVENTION

It is therefore an object of the present invention to provide a framework for information extraction from natural language documents which is application independent and provides a high degree of reusability.

It is another object of the invention to provide a framework for information extraction which integrates different Natural Language/Machine Learning techniques, such as parsing and classification.

According to the invention, there is provided an architecture of a framework for information extraction from natural language documents which is integrated in an easy to use access layer. The framework performs general information extraction, classification/categorization of natural language documents, automated electronic data transmission (e.g., E-mail and facsimile) processing and routing, and parsing.

Inside the framework, requests for information extraction are passed to the actual extractors. The framework can handle both pre- and post processing of the application data, control of the extractors, enrich the information extracted by the extractors. The framework can also suggest necessary actions the application should take on the data. To achieve the goal of easy integration and extension, the framework provides an integration (outside) application program interface (API) and an extractor (inside) API. The outside API is for the application program that wants to use the framework, allowing the framework to be integrated by calling simple functions. The extractor API is the API for doing the actual processing. The architecture of the framework allows the framework to be extended by providing new libraries exporting certain simple functions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
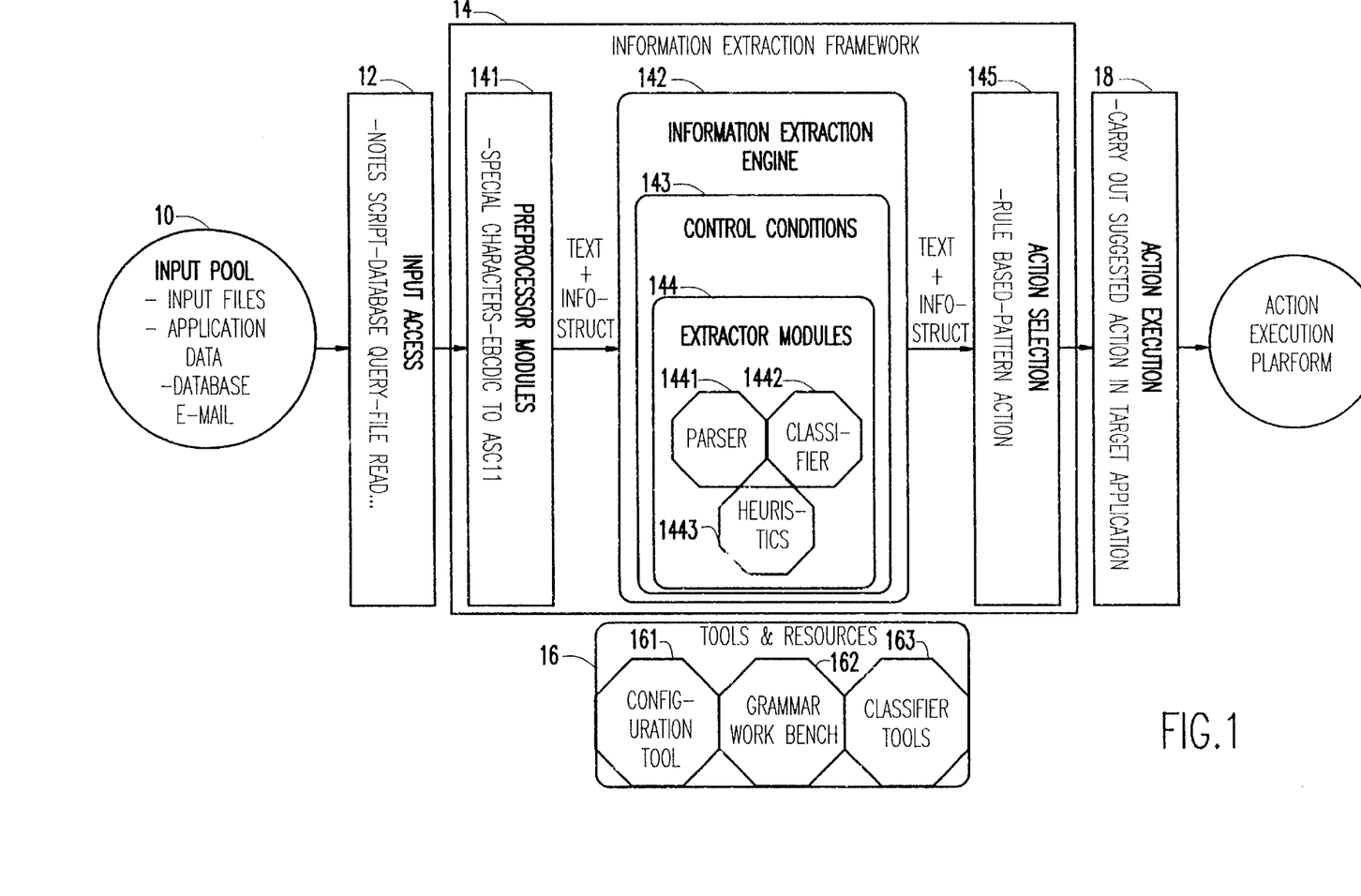
FIG. 1 is a block diagram of the general layout of the architecture of a framework for information extraction from natural language documents according to the present invention.

Referring now to the drawings, and more particularly to FIG. 1, the general layout of the architecture of the framework for information extraction according to the invention will first be described. The framework provides tools for information extraction and natural language processing integrated in an easy to use access layer. This enables adding an information extraction component to an application by interfacing to the framework via an API.

Inside the framework, requests for information extraction are passed on to the actual extractors. The framework can handle pre- and postprocessing of the application data, control of the extractors and it also enriches the information extracted by the extractors. It also can suggest necessary actions the application should take on the data.

To achieve the goal of easy integration and extension, the framework provides two interfaces:

1. Integration (outside) API: This is the API for the application that wants to use the framework. The framework can be integrated by calling some simple functions that are provided by the framework library.
2. Extractor (inside) API: This is the API for the extractors doing the actual processing. The framework can be extended by providing new libraries exporting certain simple functions.

The input pool 10 to the framework 14 may comprise input files, application data, data from a database, E-mail, facsimile, or the like. The output from this input pool is "raw" text which can be static, like a database and files, or a noncontinuous stream, like E-mail or a plain file on a hard disk, or even a speech stream. Typically, this is data provided in an application data hooking up to the framework. The input access 12 receives as its input the "raw" text output by the input pool 10 and outputs "raw" text to the framework 14. This is the interfacing layer where the data is accessed, possibly prepared and then handed over to the framework. As a last step this involves calling the frameworks outside API functions. Currently, we have provided ready-to-use input access layers (in the form of macros and API layers) for several applications like Lotus Notes, Microsoft Visual Basic, Microsoft Word, Java and also command line text file access.

The information extraction framework 14 includes preprocessor modules 141 that receive as input the "raw" text from the input access 12 and output "cleaned" text, possibly with additional technical information. This can involve stripping of irrelevant pieces of text (like technical mail headers), filtering out special characters of tags or converting between different character sets. This is done inside the framework using flexible, configurable preprocessor modules, that can be extended by user built preprocessor libraries in exactly the same fashion user built extractors can be integrated.

The information extraction framework 14 comprises an information extraction engine 142 which, in turn, includes control conditions 143 for extractor modules 144. Information extraction is accomplished with the extractor modules 144. In the illustrated embodiment, there is a set of extraction sub-engines comprising a parser 1441, a classification engine 1442, and a helper engine 1443 which extracts information by using heuristic techniques. The extractors are interchangeable, and other extractors may be added. This is possible because they are built according to a common API wrapper which defines the input/output functions.

Generally speaking, an extractor takes two pieces of input data, the natural language text to be processed and the information representation for the so far extracted information (which is usually empty at the first step), and generates an output. The output provided is an enriched information representation (and possibly modified text).

It is also possible to combine several extractors. For example, one can use a parser for preprocessing and/or postprocessing the text before or after classification. This can be useful for extracting phrasal or semantic information needed to give a better classification. Developers can add new additional extractors without access to the source-code of the framework by creating a library that exports certain functions. To use such a custom-built extractor library just put its filename in the framework configuration file (this is a plain text .INI file).

On this level of processing, some information processing is to be done which extends the scope of what the extractors are doing in two ways. First, information delivered by the engines can be mapped to user supplied domain knowledge (e.g., augmenting personal name information in the input data with other personal information from a database). Second, information delivered by an engine (which mainly operate at the sentence level) can be integrated at the level of the whole text.

The next level of processing handles the calling-sequence of the sub-engines as well as general reasoning in the information structures. The control part consults its configuration setting to decide which sub-engine to call first. Additional calling of other sub-engines can follow depending on the configuration and also on the output of the first step.

To allow for flexible control we provide a control language with Boolean expressions. The conclusion part provides some general reasoning/inferencing function on the extracted information using artificial intelligence (AI) techniques.

The information extraction framework 14 employs tools and resources 16. Each extractor and stage of processing requires task-specific tools to create the resources needed during the extraction process. In the illustrated embodiment, the tools and resources include a configuration tool 161, a grammar workbench 162, and classifier tools 163.

The output of the information extraction engine 143 is processed text and information representation (feature structure) which input to the action section 145. The data structure for information representation from the information extraction engine 143 represents simple classification facts (e.g., "this text is about sports") as well as complex information extracted from the text (e.g., the author, a deadline, etc.) or grammatical/semantic information (e.g., a parse tree). The action section 145 is a rule based and pattern action system that supports action selection in a flexible and extendible manner. An action consists not only in the choice of what to do, but also in some "arguments" with additional information needed to perform the actual action (e.g., action="store mail", arguments="folder XYZ"). The action section 145 is separated from the calling application because a specific action (e.g., "store mail") may be executed differently in different environments or mail systems.

The action execution platform 18 receives the selected action with arguments for the action from the action selection 145. The output of this platform is application dependent; that is, whereas the selected action output from the action selection 145 is application independent, the output for the action execution platform 18 is dependent on the calling application (e.g., Lotus Notes, Microsoft Word, etc.). This is because action execution typically happens in the application that called the framework. This could be inside a graphic user interface (GUI) (e.g., Windows 95/NT) or "inside" an application like Lotus Notes. It could also just display or spool some output information to a screen, a file or a database.

Figure 2:
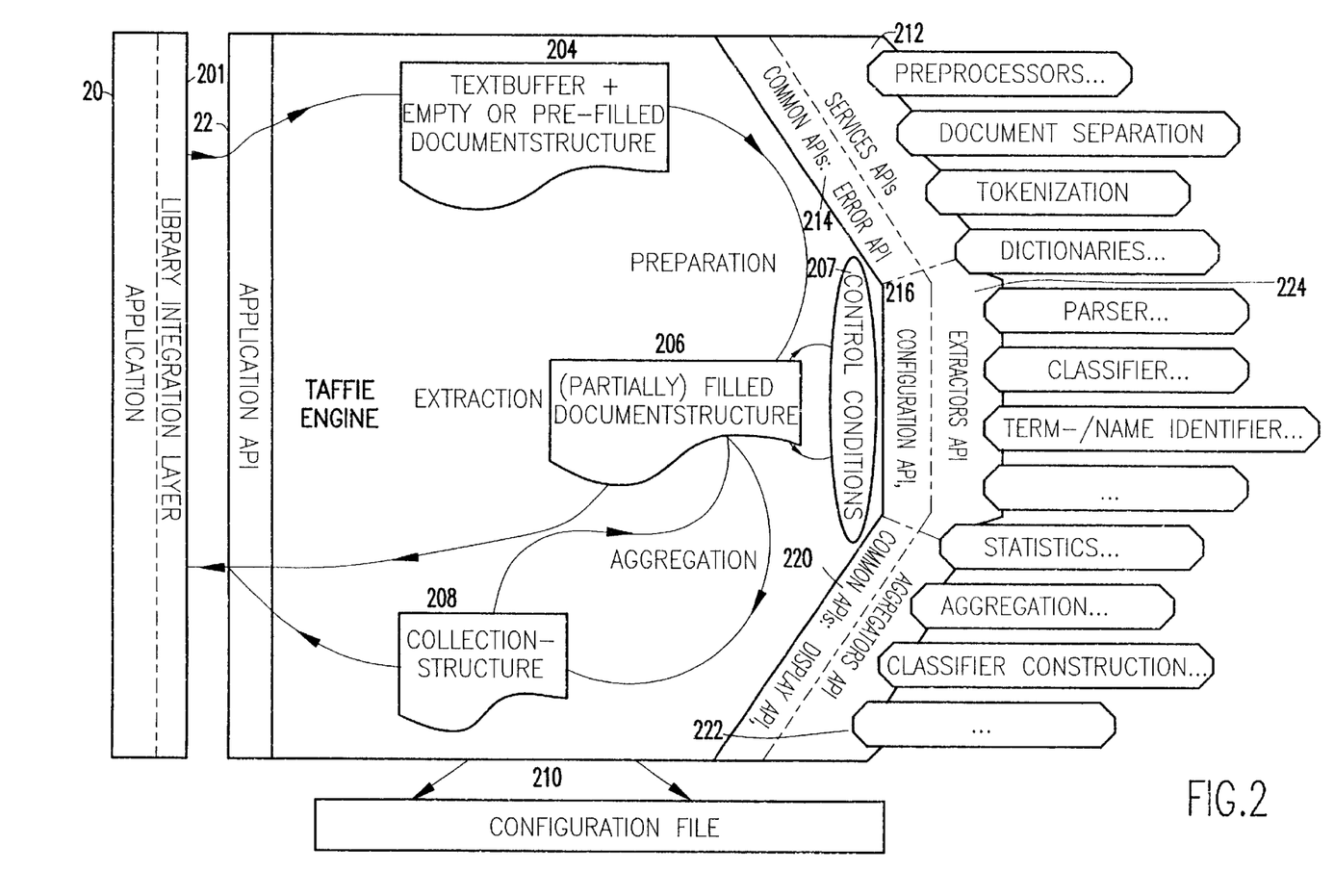
FIG. 2 is a block diagram of the text analysis framework for information extraction according to the invention.

Prior to describing FIG. 2, three basic data structures representing documents are described including (i) Infostructure, (ii) Documentstructure and (iii) Collectionstructure. More specifically, each Infostructure represents component parts and information about those parts of a document, e.g., words, phrases, sentences, paragraphs, content of subject headers, etc. To be more specific, each Infostructure is essentially a record structure of attribute value pairs, where each value itself could be an Infostructure, i.e., Infostructures can be no recursive. The Documentstructure is a group of infostructures organized in record format with document attributes such as subject, body, paragraph, etc. Some linguistic information can only be determined at this level, such as the resolution of pronoun reference (e.g., "Jon walked into the room. He sat down and talked to Mary." Identification of "he" as "Jon" is a discourse level function and would be represented in the Documentstructure). The Collectionstructure represents structure of or information about a collection of documents, e.g., what words occur and their frequencies, resolution of pronoun references based on analysis of multiple documents, etc. Training of classifiers occurs at this level.

Referring now to FIG. 2, the text analysis framework for information extraction according to the invention is shown. An application (e.g., Lotus Notes, Microsoft Word, etc.) 20 is provided with a library integration layer 201 which enables the application to make a call to the framework. The application 20 submits the documents to the framework for processing and the library integration layer 201 functions to facilitate integrating the framework into the application. The call is received and processed by the application API 22 which provides the interface between the information extraction engine and the calling application.

The information is then submitted to the Textbuffer+ empty or pre-filled Documentstructure (e.g., Textbuffer) 204. The Textbuffer 204 holds the incoming text for processing plus any structured information submitted to framework (pre-filled Documentstructure). The text is then processed (e.g., preparation) by linguistic analysis modules, e.g., document separation, language identification, tokenization, morphological analysis, etc. The linguistic analysis modules are referred to as services or service modules, since they are quite general. After each service module processes a document, the information gathered is recorded as Infostructures in the Documentstructure 206 representing all the information known about the current document. Thus, the Documentstructure is non-empty (partially filled).

The Partially Filled Documentstructure 206 provides a record of all information gathered at any point in the processing phase, which is driven by a Configuration File [208] 210. In fact, each step in the processing is determined by the Control Conditions 207, which is driven by declaratively stated information in the Configuration file [208] 210. Thus, the Configuration File [208] 210 dictates which modules are invoked, the sequencing, and indicates all other necessary parameters for each module. Also, the Configuration File [208] 210 acts as a repository of information determining the flow of control of the Service, Extractor and Aggregator modules together with pointers to any information needed to drive the selected and sequenced modules. The information then goes through an aggregation process and submitted to the Collectionstructure 208, which is a repository for all information gathered about groups of documents.

FIG. 2 is modular and provides various APIs for accessing modules such as Services API 212, Error API 214, Configuration API 216, Display API 220, Aggregators API 222 and Extractors API 224. The Services API 212 access modules such as pre-processors, document separators, tokenizers, dictionaries and morphological analyzers/stemmers, language identifiers, etc. The Configuration API 216 drives the system based on parameters. The Extractors API 224 access modules such as classifiers, parsers and semantic interpreters, names and terms identifiers, etc. The Aggregators API 222 access modules that process collections of documents and the APIs (internal) functions are provided to communicate with plug-and-play components. It is well understood by one of ordinary skill in the art that the example Services, Extractor, Aggregator modules (plug-and-play), etc. merely illustrate some of the modules envisaged to be typically part of various applications. The framework of the present invention, however, is completely neutral as to what modules are used in a particular application.

Figure 3:
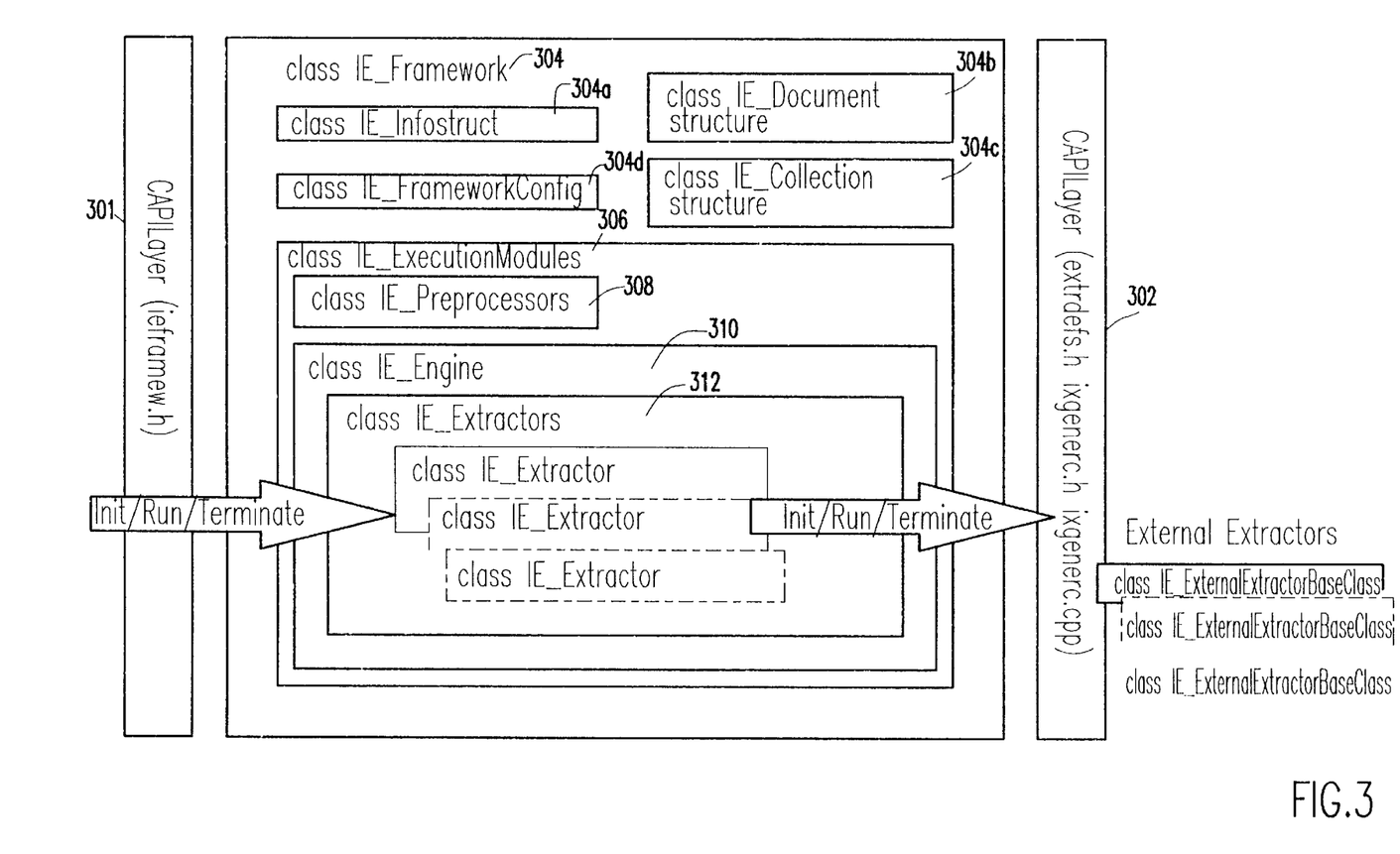
FIG. 3 is a block diagram showing the object inclusion and flow of control in the information extraction framework.

FIG. 3 is a block diagram of the object inclusion and flow of control in the information extraction (IE) framework and represents the logic call flow by object class modules (in the standard sense of object oriented programming methodology) which are in direct correspondence to the process shown in FIG. 2. Specifically, FIG. 3 shows an external C API layer 301 and C API layer 302. The C API layer 302 provides the mechanism to communicate with the plug-and-play extractors, represented by the class IE_ExtrernalExtractor- Base class.

From a processing point of view, there are five object classes shown in FIG. 3. These classes include the class IE_Framework 304, class IE_ExecutionModules 306, the class IE_Processors 308, the class IE_Engine 310 and the class IE_Extractor 312. The class IE_Extractor 312 determines the constraints on extractors and the class IE_Engine 310 determines what can be done with the extractors. The class IE_Preprocessors 308 define the generic characteristics of the preprocessor or Service modules (see FIG. 2).

The C API Layer 301 functions to initiate the framework, submit the documents and terminate the processing. Specifically, the document is first handed to the object class IE_Framework 304 (information extraction framework object class). Inside the IE_Framework 304 are 4 data structures including the class IE_Infostruct (infostructures data structure) 304a, class IE_Document (documentstructures) 304b, class IE_Collectionstructure 304c (collection structures) and class IE_FrameworkConfig (configuration file data structure) 304d. An instance of the class IE_Framework 304 invokes instances of the class IE_Execution Modules 306, where the class IE_Execution Modules 306 calls instances of the class IE_Preprocessors 308. The class IE_Preprocessors 308 perform the Services depicted in FIG. 2. The instances of the class IE_Execution Modules 306 calls instances of the class IE_Engine 310, where the class IE_Engine 310, in turn, calls instances of the class IE_Extractors 312, which covers Service modules, Aggregator modules as well as Extractor modules of FIG. 2. Depending on the information in the Configuration File 210, various extractors are called sequentially to process the documents as explained in FIG. 2. Once finished, the information in the Documentstructure (or Collectionstructure) is accessible via an API or can be returned as is.

Adaptability is one of the key issues motivating this architecture. We have made it possible to adapt the framework to different tasks just by replacing or configuring some of its components. A major goal has been to enable an "ordinary" user to make most or all of the adaption. This means that adaptation can often be done without programming or grammar writing. Where adaptation by programming is unavoidable, a developer can create a extension DLL with a specified simple API.

The information extraction framework is implemented in IBM Visual Age C++ (primarily because of its good portability). The target platforms for the framework are preferably Windows 95/NT, AIX/UNIX and OS/2. However, the framework of the present invention is designed to be platform independent. The whole Engine is a DLL (shared library on AIX). All extractors are DLLs also. Preexisting modules (parser, classifier) written in C/C++ could be integrated via wrapper DLLs hiding their specific API.

API Details

Application (Outside API) (Simplified)

To interface to the framework, an application has to call mainly five functions:

init (ConfigurationFilename) This will initialize the framework. It has to be called only once per session. The following functions can be called in a loop for each document the application wants to analyze.

clearDocumentStruct ( ) This will clear the results of the last document. (This not only needed for the first document in the loop.)

run(data) This will extract information from your data and store in an DocumentStruct retrieve results (There are various functions for accessing the resulting DocumentStructure.)

terminate ( ) This will clean up and free memory. Has to be called only once per session.

In further embodiments, the application may call other functions, for example:

begindocument: ( )

runDocumentPart (docPartContent, docPartLabel)

enddocument ( )

Extractor (Inside API) (Simplified)

init (ConfigurationInformation) This will be called from the framework once per session to initialize the Extractor. The following functions can be called in a loop for each document the application gives the framework to analyze.

run (data) This will be called from the framework for each document the application wants to analyze. The extractor should process the data and store the results in the resulting InfoStructure. (There is a simple API for this.)

terminate ( ) This will be called from the framework once per session to clean up and free memory.

Configuration File Fornat

The configuration file for the framework is a simple text file in the standard (Windows). INI format. This means it consist of sections (marked be square brackets) that have entries with (possibly comma separated sequences) values. Comments are preceded by a semicolon.

An example configuration file for the framework looks like this:

;global settings [IE]
;output in GUI messageboxes (other values are CONSOLE and OFF) DisplayMode=GUI
;should the framework automatically display the results?DisplayResultingInfostruct=NO
;list of all preprocessor modules that the framework should call
;(this must be filenames of libraries/DLLs in the path) [Preprocessors] 1=StripHeader 2=DoubleFirstLine
;configuration information for (one) preprocessor [StripHeader] StripTill=Subject:, Subj:, Subject, Subj
;list of all preprocessor modules that the framework should call
;(this must be filenames of Libraries/DLLs in the path)
;can be followed by a label to describe the section with
;configuration information for this classifier [Extractors]
;External Extractor Classifier Yorktown with Reuters Data 1=IEExClaY, Reuters
;External Extractor Parser with Deadline Grammar 2=IEExPars, Deadline
;configuration information for the Classifier [IEExClaY Reuters] Rulefile= "D:\PROJECTS\IE\IEExClaY.dat\Reuters\ rules.txt"StopWords= "D:\PROJECTS\IE\IEExClaY.dat\Reuters\ Stopwds.txt" Dictionary= "D:\PROJECTS\IE\IEExClaY.dat\Reuters\ base12k.txt" Logfile= "D:\PROJECTS\IE\IEExClaY.dat\Reuters\ rulapply.log" StoreAttribute=Categories UseLabels=NO
;configuration information for the Parser [IEExPars Deadline] Grammar= d:\projects\IE\IEExPars.dat\deadline\ deadline AttributeIfSucceeds=Categories ValueIfSucceeds= Deadline SentenceAttribute=Sentence ParseOnlyIfContains=deadline, due, delivered, ready, finished, finish TreatAsAbbreviations=info, etc, Conf

| Header Files |
|---|
| Application (outside API) |

```
/*------------------------------------------------------------*/
/* Definitions */
/*------------------------------------------------------------*/
#define IESESSIONHANDLE void*
/*------------------------------------------------------------*/
/* Basic functions */
/* */
/*------------------------------------------------------------*/
// this has to be the first call to the engine, an
// application has to store the SESSIONHANDLE and
// pass with each subsequent call
// IE_Init is to be called only once per session
// (IE_Run can be called multiple times)
// INIFILE is the path to an standard .INI file with
// the configuration for the engine
// RETURN: OK or Errorcode
extern StdCall DllExport IESESSIONHANDLE
    IE_Init(char* iniFile) ;
// passes text DATA data to the engine for
// processing
// results can be retrieved with the access
// functions below
// RETURN: OK or Errorcode
extern StdCall DllExport int IE_Run(IESESSIONHANDLE
    session, char* data) ;
// like IE_Run but with the path to a text file in
// FILENAME for processing
// RETURN: OK or Errorcode
extern StdCall DllExport int
    IE_RunOnFile(IESESSIONHANDLE session, char*
    filename) ;
// should be called before/after each run/access to
// clear results
// RETURN: OK or Errorcode
extern StdCall DllExport int
    IE_ClearInfostructs(IESESSIONHANDLE session) ;
// call this once per session to free memory
// (SESSIONHANDLE will be void after)
// RETURN: OK or Errorcode
extern StdCall DllExport int
    IE_Terminate(IESESSIONHANDLE session) ;
/*------------------------------------------------------------*/
/* Configuration functions */
/* */
/*------------------------------------------------------------*/
// set the configuration to the path of a new or
// changed configuration file
// RETURN: OK or Errorcode
extern StdCall DllExport int
    IE_SetConfiguration(IESESSIONHANDLE session,
    char* iniFile) ;
// get the path of the current configuration file to
// a string buffer
// RETURN: OK or Errorcode if string is too small
extern StdCall DllExport int
    IE_GetConfiguration(IESESSIONHANDLE session,
    char *buffer, int buffSize) ;
/*------------------------------------------------------------*/
/* Result access functions */
/* */
/* these function provide access to the resulting
infostructure. */
/* the structure is a sequence of attribute value
pairs. */
/* each attribute is unique and has a *SEQUENCE* */
/* of values. */
/* each value in the sequence (starting with 1) */
/* can be either atomic (number, string etc.), */
/* or recursively a complete infostructure in */
```

Header Files

```c
/* itself. */
/* examination of nested infostructures is done by */
/* setting the examination context to the */
/* infostructure in question. */
/* Most function provide access to the attributes */
/* in two ways: */
/* either by name of the attribute (S-postfix) */
/* or by the position of the attribute in the */
/* sequence of attributes (I-postfix). */
/* (this can be useful in FOR loops) */
/*--------------------------------------------------------------------------------*/
// get a string representation of the resulting
// infostructure in bracketed notation (just for
// display purposes)
// RETURN: OK or Errorcode if string is to small
extern StdCall DllExport int
    IE_GetResultAsString(IESESSIONHANDLE session,
    char *buffer, int buffSize) ;
// get the number of attributes in the examinated
// infostructure
// RETURN: Number of Attributes
extern StdCall DllExport int
    IE_NumberOfResultAttributes(IESESSIONHANDLE
    session) ;
// get info if the value number VALPOS of the
// attribute with name ATTRNAME is atomic or not
// RETURN: True or False
extern StdCall DllExport int
    IE_IsResultAttrValueAtomicS(IESESSIONHANDLE
    session, char *attrName, const int valPos) ;
// get info if the value number VALPOS of the
// attribute with the position ATTRNBR is atomic or
// not
// RETURN: True or False
extern StdCall DllExport int
    IE_IsResultAttrValueAtomicI(IESESSIONHANDLE
    session, int attrNbr, const int valPos) ;
// get the number of values of the attribute with
// the name ATTRNAME
// RETURN: number of values, or 0 if ATTRNAME is
// not defined
extern StdCall DllExport int
    IE_NumberOfResultValuesAttrS(IESESSIONHANDLE
    session, char *attrName) ;
// get the number of values of the attribute with
// the position ATTRNBR
// RETURN: number of values, or 0 if ATTRNBR is out
// of range
extern StdCall DllExport int
    IE_NumberOfResultValuesAttrI(IESESSIONHANDLE
    session, int attrNbr) ;
// copy the string representation of the value at
// VALPOS of atribute ATTRNAME to a string buffer
// if valPos is 0, a comma separated list of the
// representations of all values is returned
// RETURN: OK or Errorcode if string too small
// NULL string if ATTRNAME is not defined, or VALPOS
// is out of range
extern StdCall DllExport int
    IE_GetResultAttrValueS(IESESSIONHANDLE session,
    char *attrName, int valPos, char *buffer, int
    buffSize) ;
// copy the string representation of the value at
// VALPOS of attribute ATTRNBR to a string buffer
// if valPos is 0, a comma separated list of the
// representations of all values is returned
// RETURN: OK or Errorcode if string too small
// NULL string if ATTRNAME is not defined, or VALPOS
// is out of range
extern StdCall DllExport int
    IE_GetResultAttrValueI(IESESSIONHANDLE session,
    int attrNbr, int valPos, char *buffer, int
    buffSize) ;
// append the new string value STRVALUE to the
// sequence of values for attribute with name
// ATTRIBUTE (creates a new attribute is ATTRIBUTE
// doesn't exist yet)
// RETURN: OK or Errorcode
extern StdCall DllExport int
    IE_AddValueToAttrS(IESESSIONHANDLE session,
    char *attribute, char *strValue) ;
// append the new integer value INTVALUE to the
// sequence of values for attribute with name
// ATTRIBUTE (creates a new attribute is ATTRIBUTE
// doesn't exist yet)
// RETURN: OK or Errorcode
extern StdCall DllExport int
    IE_AddValueToAttrI(IESESSIONHANDLE session,
    char *attribute, int intValue) ;
/*--------------------------------------------------------------------------------*/
/* The following functions are for use by */
/* extractors mainly */
/*--------------------------------------------------------------------------------*/
/*--------------------------------------------------------------------------------*/
/* Classifer functions */
/*--------------------------------------------------------------------------------*/
// add a category (and optional a confidence
// measurement) to the current result set
// if CONFIDENCE is <= 0 it is ignored.
// the attribute label is determined by the engine
// RETURN: OK or Errorcode
extern StdCall DllExport int
    IE_AddCategory(IESESSIONHANDLE session, char
    *category, float confidence) ;
/*--------------------------------------------------------------------------------*/
/* Display functions */
/* */
/* Extractors should use this functions to */
/* display information and errors. */
/* They will be shown according to the value of */
/* the INI variable Outputmode (GUI, Console, */
/* File, none) */
/*--------------------------------------------------------------------------------*/
// get the current display mode (GUI, cosole, file,
// off)
// RETURN: current display mode (codes defined in
// display.hpp)
extern StdCall DllExport int
    IE_GetDisplayMode(IESESSIONHANDLE session) ;
// display a message
// RETURN: OK or Errorcode
extern StdCall DllExport void
    IE_DisplayMsg(IESESSIONHANDLE session, char*
    msg) ;
// display an error
// RETURN: OK or Errorcode
extern StdCall DllExport void
    IE_DisplayError(IESESSIONHANDLE session, char*
    msg) ;
// display/hide a progressbar returns immediately
// after showing/destroying the bar
// RETURN: OK or Errorcode
extern StdCall DllExport void
    IE_DisplayProgress(IESESSIONHANDLE session, int
    showIt, char* title) ;
// set the level of the progressbar to LEVEL
// (ignored if LEVEL is smaller than previous one)
// level must be between 0 and 100
// RETURN: OK or Errorcode
extern StdCall DllExport void
    IE_SetProgressLevel(IESESSIONHANDLE session,
    int level) ;
// add LEVEL to the value of the previous level
// level must be between 0 and 100
// RETURN: OK or Errorcode
extern StdCall DllExport void
    IE_AddProgressLevelI(IESESSIONHANDLE session,
    int level) ;
// add LEVEL to the value of the previous level
// (float for more precicion)
// level must be between 0 and 100
// RETURN: OK or Errorcode
extern StdCall DllExport void
    IE_AddProgressLevelF(IESESSIONHANDLE session,
```

Header Files

```
    float level);
/*-----------------------------------------------------------------*/
/* Configuration query/INI file functions */
/* */
/* Extractors should use this functions to query */
/* information about configuration values in the */
/* common .INI file for the engine and all */
/* extractors. */
/* INI files have sections that contain */
/* attributes with (possibly) comma separated */
/* sequences of) values. */
/* They have to pass the ID String they got */
/* passed during their initialisation as a first */
/* argument (SECTION) */
/*-----------------------------------------------------------------*/
// copy the string representation of the value at
// VALPOS of atribute ATTRNAME to a string buffer
// if valPos is 0, a comma separated list of all
// values is returned
// RETURN: OK or Errorcode if string to small
// NULL string if SECTION of ATTRIBUTE is not
// defined, or VALPOS is out of range
extern StdCall DllExport int
        IE_GetIniValue(IESESSIONHANDLE session, char*
        section, char* attribute, int valPos, char
        *buffer, int buffSize);
// return the boolean value of the value at VALPOS
// of atribute ATTRNAME
// RETURN: true if the value is one of the
// following: TRUE, ON, YES, T, Y,+, 1)
extern StdCall DllExport int
        IE_GetIniValueAsBoolean(IESESSIONHANDLE
        session, char* section, char* attribute, int
        valPos);
// return the integer value of the value of VALPOS
// of atribute ATTRNAME
// RETURN: conversion of the value to int (0 if not
// successful)
extern StdCall DllExport int
        IE_GetIniValueAsInt(IESESSIONHANDLE session,
        char* section, char* attribute, int valPos);
// RETURN: number of attributes in section SECTION
extern StdCall DllExport int
        IE_NumberOfAttributes(IESESSIONHANDLE session,
        char* section);
// RETURN: number of values of attribute ATTRIBUTE
// in section SECTION
extern StdCall DllExport int
        IE_NumberOfValues(IESESSIONHANDLE session,
        char* section, char* attribute);
Extractor (inside API)
/*-----------------------------------------------------------------*/
/* Definitions */
/*-----------------------------------------------------------------*/
// just a handle definition for readability
#define IEEXTRACTORHANDLE void*
/*-----------------------------------------------------------------*/
/* Exported functions */
/* these are all the functions an extractor */
/* Library has to export */
/*-----------------------------------------------------------------*/
extern StdCall DllExport IEEXTRACTORHANDLE
        init(IESESSIONHANDLE sessionHandle, char*
        idString);
extern StdCall DllExport int run(IEEXTRACTORHANDLE
        extractorHandle, char* data);
extern StdCall DllExport int
        terminate(IEEXTRACTORHANDLE extractorHandle);
extern StdCall DllExport int
        gettype(IEEXTRACTORHANDLE extractorHandle);
extern StdCall DllExport char*
        getinfo(IEEXTRACTORHANDLE extractorHandle, int
        infoType);
```

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An information extraction architecture capable of extracting information from natural language documents, comprising:

application program interfacing means for receiving a natural language document from an application program and converting the natural language document into raw data, said interfacing means being configurable without altering a source code of said application program;

interfacing extraction means for receiving the raw data from the application program interfacing means and providing the raw data to an extractor, whereby the extractor extracts text and information from the raw data; and action means for providing an application independent external action on the extracted data and outputting the application independent external action extracted data to the application program.

2. The architecture of claim 1, further comprising:

initializing means for initializing a framework in response to the application program;

storing means for storing the extracted information; and retrieving means for retrieving the stored extracted information.

3. The architecture of claim 2, further comprising terminating means for terminating the extraction processes and clearing free memory.

4. The architecture of claim 1, wherein the action means includes:

action execution means for executing a desired action, the action execution means being application dependent.

5. The architecture of claim 1, further comprising storing means for storing incoming text data received from the application program interfacing means prior to the text data being extracted and processed.

6. The architecture of claim 1, wherein the application program interfacing means is an input access layer that is capable of interfacing with application programs.

7. The architecture of claim 1, wherein the interfacing extraction means includes preprocessing means for cleaning the raw data.

8. The architecture of claim 7, wherein the preprocessing means includes at least one (i) stripping means for stripping irrelevant pieces of text, (ii) filter means for filtering out special characters of tags and (iii) converting means for converting between different character sets.

9. The architecture of claim 1, further comprising controlling means for controlling the interfacing extractor means during selection of a desired extractor.

10. The architecture of claim 1, further comprising recording means for providing a record of all information gathered during extraction of the raw data.

11. The architecture of claim 1, further comprising library means associated with the application program interfacing means, the library means providing a library of application programs so that the application program interfacing means interfaces between the application programs and the interfacing extracting means.

12. The architecture of claim 1, wherein the application program interfacing means is modular.

13. A method of extracting information from natural language documents, comprising:

interfacing an application program with a framework for information extraction from natural language documents, said framework being configurable without altering a source code of the application program;

interfacing extracted information from raw data, received in response to interfacing the application program with an extractor, the extracted information being processed text and information representation; and providing an application independent action specification, associated with the extracted information, and outputting the application independent action specification to the application program for performing an application dependent implementation of the action specification.

* * * * *